United States Patent
Theriault et al.

(10) Patent No.: US 11,691,747 B2
(45) Date of Patent: Jul. 4, 2023

(54) FAULT DETECTION FOR A SPEED SENSING SYSTEM OF A MULTI-ENGINE ROTORCRAFT

(71) Applicant: PRATT & WHITNEY CANADA CORP., Longueuil (CA)

(72) Inventors: Sarah Theriault, Boucherville (CA); Poi Loon Tang, Montréal (CA); Sean McCarthy, Beaconsfield (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 589 days.

(21) Appl. No.: 16/893,944

(22) Filed: Jun. 5, 2020

(65) Prior Publication Data

US 2021/0380266 A1    Dec. 9, 2021

(51) Int. Cl.
| | |
|---|---|
| *B64D 31/06* | (2006.01) |
| *B64F 5/60* | (2017.01) |
| *B64C 27/06* | (2006.01) |
| *B64D 37/00* | (2006.01) |
| *G01P 3/00* | (2006.01) |

(52) U.S. Cl.
CPC .............. *B64D 31/06* (2013.01); *B64C 27/06* (2013.01); *B64D 37/00* (2013.01); *B64F 5/60* (2017.01); *G01P 3/00* (2013.01)

(58) Field of Classification Search
CPC ... B64C 27/06; B64F 5/60; G01P 3/00; G01P 21/02
See application file for complete search history.

(56) References Cited

U.S. PATENT DOCUMENTS

| | | | |
|---|---|---|---|
| 4,276,744 A | 7/1981 | Pisano | |
| 4,667,114 A | 5/1987 | Rossi | |
| 5,265,825 A * | 11/1993 | Ebert | G05D 1/0858 |
| | | | 244/184 |
| 5,363,317 A | 11/1994 | Rice et al. | |
| 10,017,268 B2 | 7/2018 | Fraenzel | |
| 10,392,962 B2 | 8/2019 | Rowe et al. | |
| 10,436,060 B2 * | 10/2019 | Dubreuil | F01D 21/003 |
| 2015/0292348 A1 | 10/2015 | Pasquier et al. | |

FOREIGN PATENT DOCUMENTS

FR    2998058 A1 *   5/2014   ............. B64D 31/06

OTHER PUBLICATIONS

Extended European Search Report dated Nov. 8, 2021 in counterpart EP application No. 21178080.4.

* cited by examiner

*Primary Examiner* — James M McPherson
*Assistant Examiner* — Kyle J Kingsland
(74) *Attorney, Agent, or Firm* — Norton Rose Fulbright Canada LLP (57) ABSTRACT

The present disclosure provides methods and systems for fault detection for a speed sensing system of a multi-engine rotorcraft. A shaft speed for a first engine and a rotor speed for at least one rotor of the multi-engine rotorcraft are obtained. The shaft speed is compared to the rotor speed. When the shaft speed is greater than the rotor speed, a first fault in the speed sensing system is detected and a first speed sensing system fault signal is issued. When the shaft speed is less than the rotor speed, a determination is made regarding whether the first engine is coupled the at least one rotor based on a fuel flow to the first engine. A second fault in the speed sensing system is detected and a second speed sensing system fault signal is issued responsive to determining that the first engine is coupled to the at least one rotor.

20 Claims, 6 Drawing Sheets

FAULT DETECTION FOR A SPEED SENSING SYSTEM OF A MULTI-ENGINE ROTORCRAFT

TECHNICAL FIELD

The present disclosure relates generally to a multi-engine rotorcraft, and more particularly to a fault detection in multi-engine rotorcraft.

BACKGROUND OF THE ART

Multi-engine rotorcraft make use of speed signals from engines and rotors to control the operation of the rotorcraft. In some cases, the speed signals include an engine output shaft rotational speed and a rotor rotational speed. Although unlikely, fault events can occur for speed sensors. As a result, engine control systems are provided with functionality to assess whether speed sensors are experiencing a fault event.

While existing fault event detection approaches are suitable for their purposes, improvements remain desirable.

SUMMARY

In accordance with a broad aspect, there is provided a fault detection method for a speed sensing system of a multi-engine rotorcraft having at least one rotor. A shaft speed for a first engine of the multi-engine rotorcraft and a rotor speed for the at least one rotor are obtained. The shaft speed is compared to the rotor speed. When the shaft speed is greater than the rotor speed, a first fault in the speed sensing system is detected and a first speed sensing system fault signal is issued. When the shaft speed is less than the rotor speed, a determination is made regarding whether the first engine is coupled the at least one rotor based on a fuel flow to the first engine. A second fault in the speed sensing system is detected and a second speed sensing system fault signal is issued responsive to determining that the first engine is coupled to the at least one rotor.

In accordance with another broad aspect, there is provided a system for performing fault detection for a speed sensing system of a multi-engine rotorcraft having at least one rotor. The system comprises a processing unit, and a non-transitory computer-readable medium having stored thereon program instructions. The program instructions are executable by the processing unit for: obtaining a shaft speed for a first engine of the multi-engine rotorcraft and a rotor speed for the at least one rotor; comparing the shaft speed to the rotor speed; when the shaft speed is greater than the rotor speed, detecting a first fault in the speed sensing system and issuing a first speed sensing system fault signal; and when the shaft speed is less than the rotor speed: determining whether the first engine is coupled the at least one rotor based on a fuel flow to the first engine; and detecting a second fault in the speed sensing system and issuing a second speed sensing system fault signal responsive to determining that the first engine is coupled to the at least one rotor.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1A:
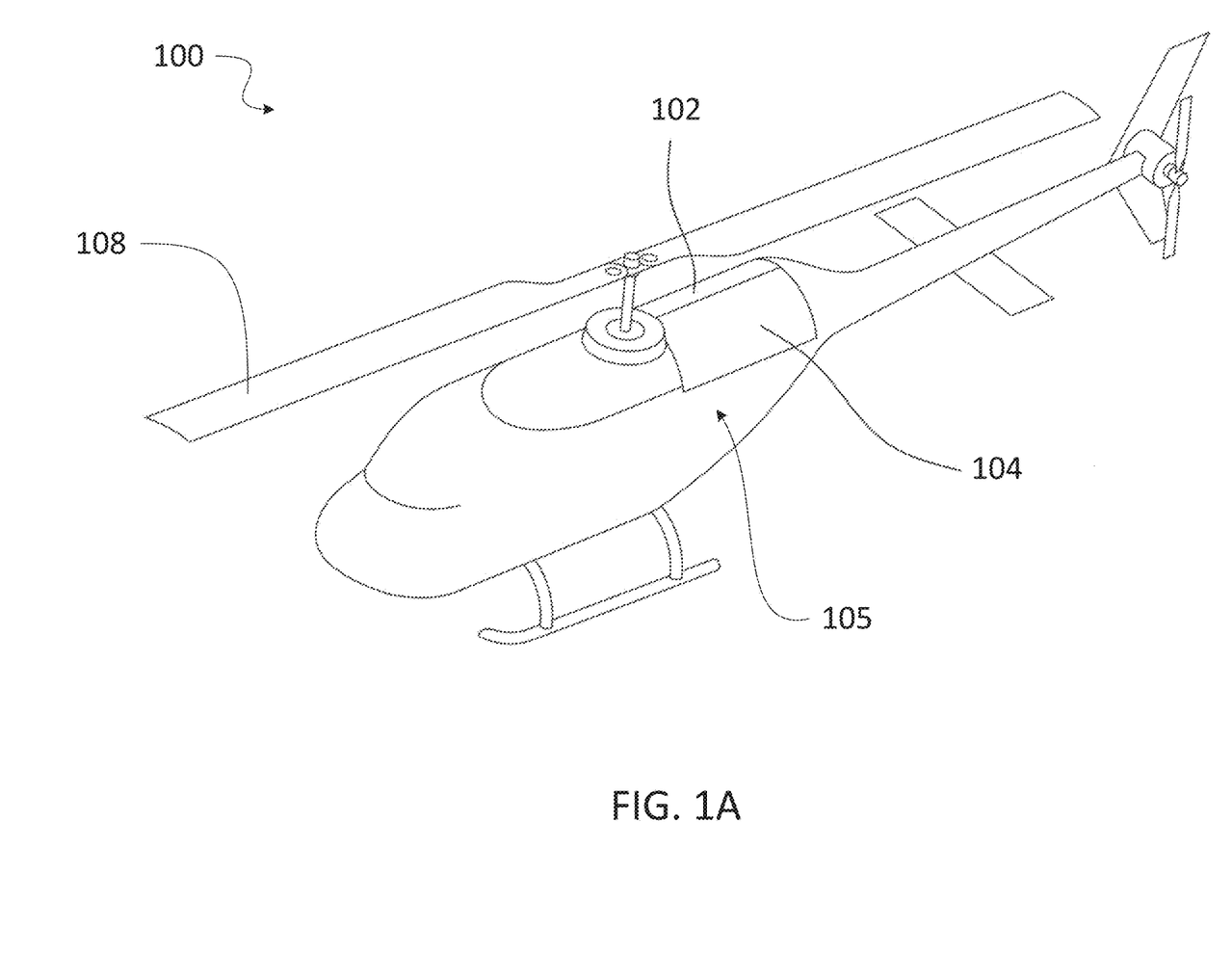
FIG. 1A is a schematic view of a multi-engine rotorcraft.

There are described herein methods and systems for fault detection of a speed sensing system of a multi-engine rotorcraft having at least one rotor. FIG. 1A depicts an example multi-engine rotorcraft 100, which in this case is a helicopter. The rotorcraft 100 includes at least two gas turbine engines 102, 104. These two engines 102, 104 may be interconnected, in the case of the depicted helicopter application, by a common gearbox to form a multi-engine system 105, as shown in FIG. 1B, which drives a main rotor 108.

Figure 1B:
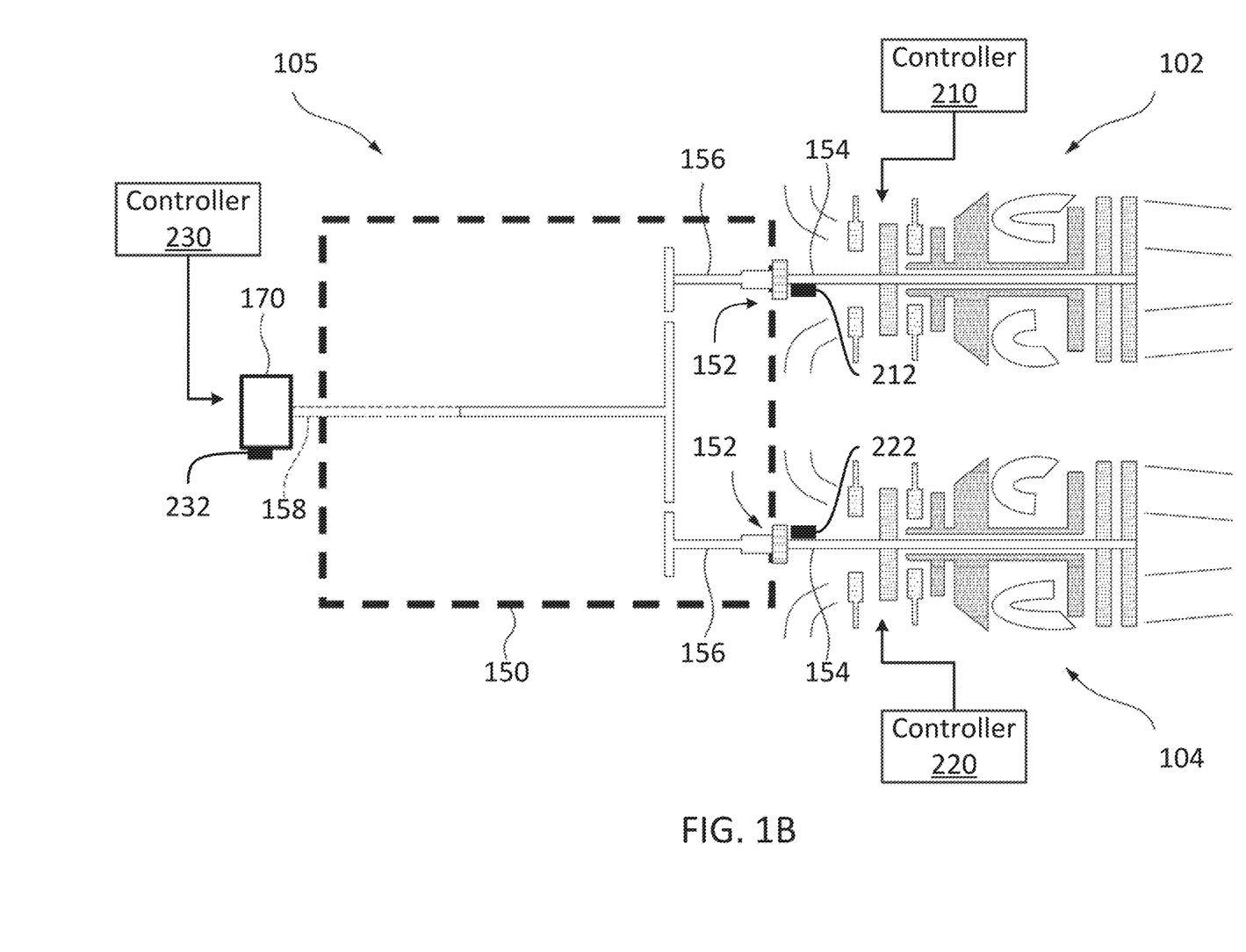
FIG. 1B is a schematic representation of an example multi-engine system for the rotorcraft of FIG. 1A, showing axial cross-sectional views of two gas turbine engines.

Turning now to FIG. 1B, illustrated is an example multi-engine system 105 that may be used as a power plant for an aircraft, including but not limited to a rotorcraft such as the helicopter 100. The multi-engine system 105 may include two or more gas turbine engines 102, 104. In the case of a helicopter application, these gas turbine engines 102, 104 will be turboshaft engines. More particularly, the multi-engine system 105 of this embodiment includes first and second turboshaft engines 102, 104 each having a respective transmission 152 interconnected by a common output gearbox 150 to drive a common load 170. In one embodiment, the common load 170 may comprise a rotary wing of the rotorcraft 100. For example, the common load 170 may be a main rotor 108 of the aircraft 100. Depending on the type of the common load 170 and on the operating speed thereof, each of turboshaft engines 102, 104 may be drivingly coupled to the common load 170 via the output gearbox 150, which may be a speed-reduction type gearbox.

For example, the gearbox 150 may have a plurality of transmission shafts 156 to receive mechanical energy from respective output shafts 154 of respective turboshaft engines 102, 104. The gearbox 150 may be configured to direct at least some of the combined mechanical energy from the plurality of the turboshaft engines 102, 104 toward a common output shaft 158 for driving the common load 170 at a suitable operating (e.g., rotational) speed. It is understood that the multi-engine system 105 may also be configured, for example, to drive accessories and/or other elements of an associated aircraft. The gearbox 150 may be configured to permit the common load 170 to be driven by either of the turboshaft engines 102, 104 or, by a combination of both engines 102, 104 together.

Control of the multi-engine system 105 is effected by one or more controller(s), illustrated in FIG. 1B as controllers 210, 220, and 230, which are each associated with a particular component of the multi-engine system 105: the controller 210 is associated with the engine 102, the controller 220 is associated with the engine 104, and the controller 230 is associated with the common load 170. In some embodiments, the controllers 210, 220, 230 are FADEC(s), electronic engine controller(s) (EEC(s)), or the like, that are programmed to control the operation of the engines 102, 104 and the common load 170. In some embodiments, the operation of the engines 102, 104, and of the rotor 108 is controlled by way of one or more actuators, mechanical linkages, hydraulic systems, and the like. The controller 210 can be coupled to the actuators, mechanical linkages, hydraulic systems, and the like, in any suitable fashion for effecting control of the engines 102, 104 and/or of the rotor 108. For example, if a change in the operating conditions of the aircraft 100 is detected without any corresponding change in inputs from an operator of the aircraft 100, the FADEC can adjust the inputs to compensate for the uncommanded change.

Figure 1C:
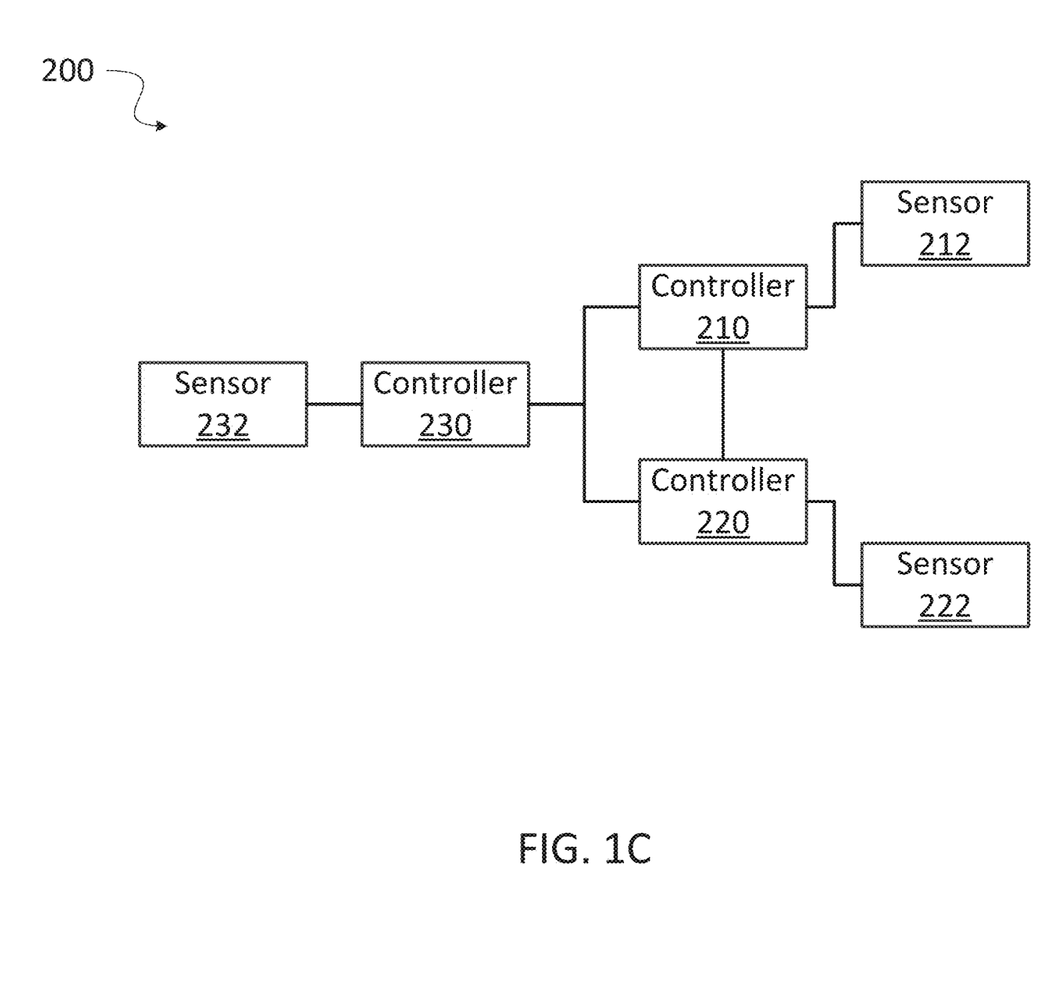
FIG. 1C is a block diagram of an example speed sensing system for the multi-engine rotorcraft of FIG. 1A.

With continued reference to FIG. 1B and additional reference to FIG. 10, the multi-engine system 105 also includes a number of speed sensors, illustrated as sensors 212, 222, 232. Together, the controllers 210, 220, 230 and the sensors 212, 222, 232 form a speed sensing system 200 for the rotorcraft 100. The sensors 212, 222, 232 are each associated with a particular mechanical component of the multi-engine system 105, and serve to measure the rotational speed of the associated mechanical component. In the example illustrated in FIG. 1B, the sensors 212 and 222 are coupled to the output shafts 154 of the engines 102, 104, respectively, and are configured for measuring a rotational speed of their respective output shaft 154. The sensor 232 is coupled to the common load 170, and is configured for measuring a rotational speed of one or more elements of the common load 170, for instance the rotor 108, or the common output shaft 158. The speed sensing system 200 can thus monitor the rotational speed of the output shafts 154 and 158 and control the operation of the multi-engine system 105 based thereon.

It should be noted that although the present discussion focuses primarily on the inclusion of speed sensors in the form of sensors 212, 222, 232, the multi-engine system 105 and the rotorcraft 100 can additionally include any number of sensors, including fuel flow sensors, temperature sensors, pressure sensors, and the like. In addition, the controller 210, 220, 230 can monitor any suitable number of other parameters, and can control the elements of the multi-engine system 105 in any other suitable fashion. It should be noted that in some embodiments, the controllers 210, 220 can be embodied as a single unified engine controller, which is coupled to both engines 102, 104, and to the sensors 212, 222. In embodiments in which the multi-engine rotorcraft 100 includes more than two engines, a single unified engine controller can be used for all engines of the rotorcraft 100, one or more unified engine controllers can be assigned to groups of engines, or single-engine controllers can be provided for each of the engines of the rotorcraft 100.

Figure 2:
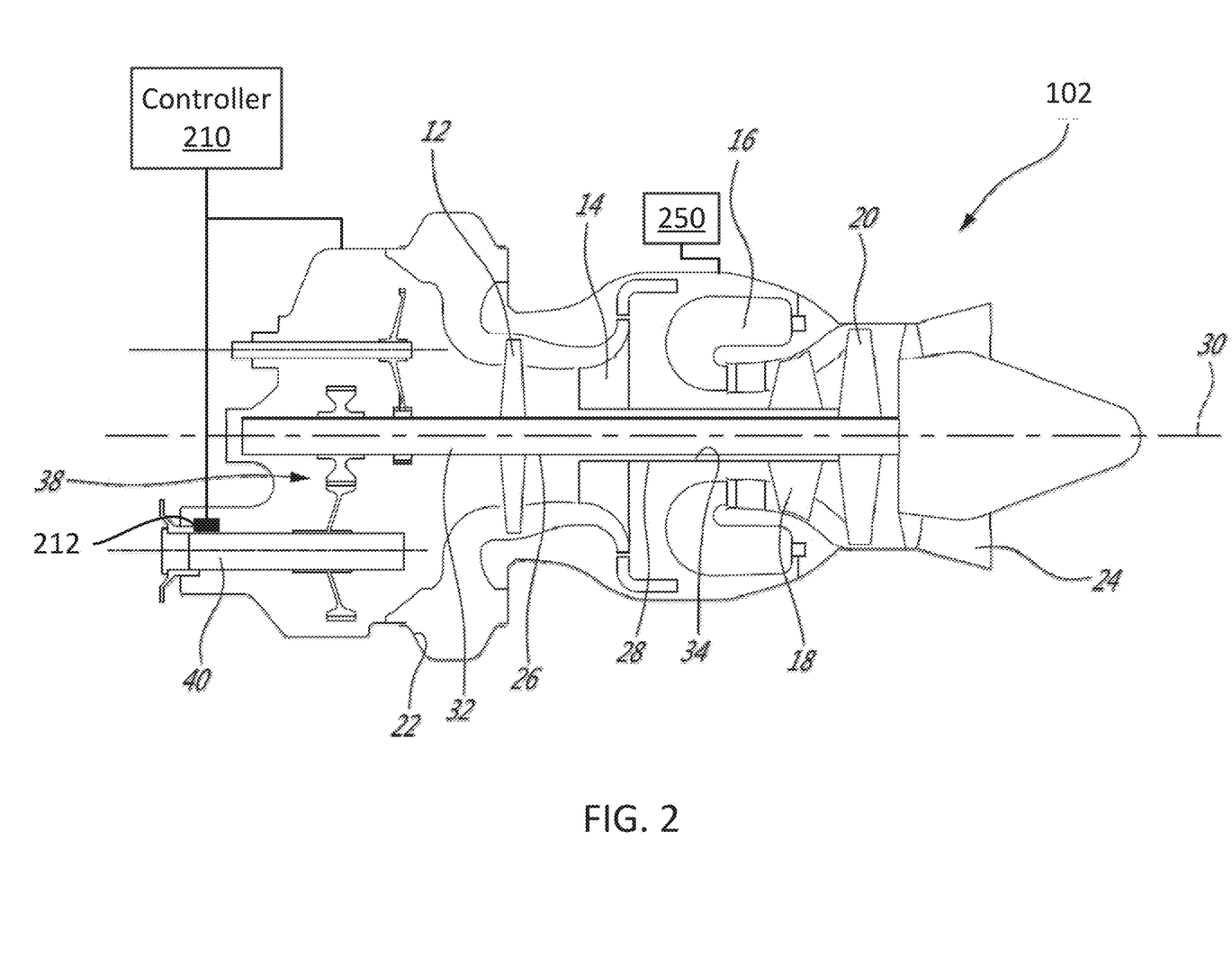
FIG. 2 is a cross-sectional view of an example turboshaft engine of the aircraft of FIG. 1A.

With reference to FIG. 2, the turboshaft engines 102, 104 can be embodied as gas turbine engines. Although the foregoing discussion relates to engine 102, it should be understood that engine 104 can be substantively similar to engine 102. In this example, the engine 102 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12. The engine 102 is provided with fuel via a fuel source 250, which can be coupled to the engine 102 in any suitable fashion. Control of the flow of fuel to the engine 102 can be effected by the controller 210, by a controller associated with the fuel source 250, or by any other suitable controller.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e. two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another. The engine 102 may include a transmission 38 driven by the low pressure shaft 32 and driving a rotatable output shaft 40. The transmission 38 may vary a ratio between rotational speeds of the low pressure shaft 32 and the output shaft 40.

As described hereinabove, control of the operation of the engine 102 can be effected by one or more control systems, for example the controller 210, which forms part of the speed sensing system 200, along with the sensor 212. The controller 210 can modulate a fuel flow rate provided to the engine 102, the position and/or orientation of variable geometry mechanisms within the engine 102, a bleed level of the engine 102, and the like, based on readings provided by the sensor 212, or based readings provided by other sensors within, or in the periphery of, the engine 102.

In some cases, it can occur that one or more of the sensors 212, 222, 232 experiences a fault event. A fault event for one of the sensors 212, 222, 232 occurs when the speed readings provided by the particular sensor are not representative of an actual rotational speed for the output shaft to which the particular sensor is associated. For instance, when the sensor 212 experiences a fault event, the speed readings provided by the sensor 212 are no longer representative of the actual rotational speed of the output shaft 154 of the engine 102. A fault event can occur for a number of reasons, including failure of the sensor 212, dissociation of the sensor 212 from the output shaft 154, the presence of debris or other interfering materials affecting the readings provided by the sensor 212, faulty connection between the sensor 212 and the controller 210, or for any other number of reasons. In some situations, the controller 210 to which the sensor 212 is coupled may not be able to detect the occurrence of the fault event based on the values provided by the sensor 212 itself. That is to say, the values provided by the sensor 212 may appear accurate to the controller 210, but may in fact be erroneous.

Figure 3:
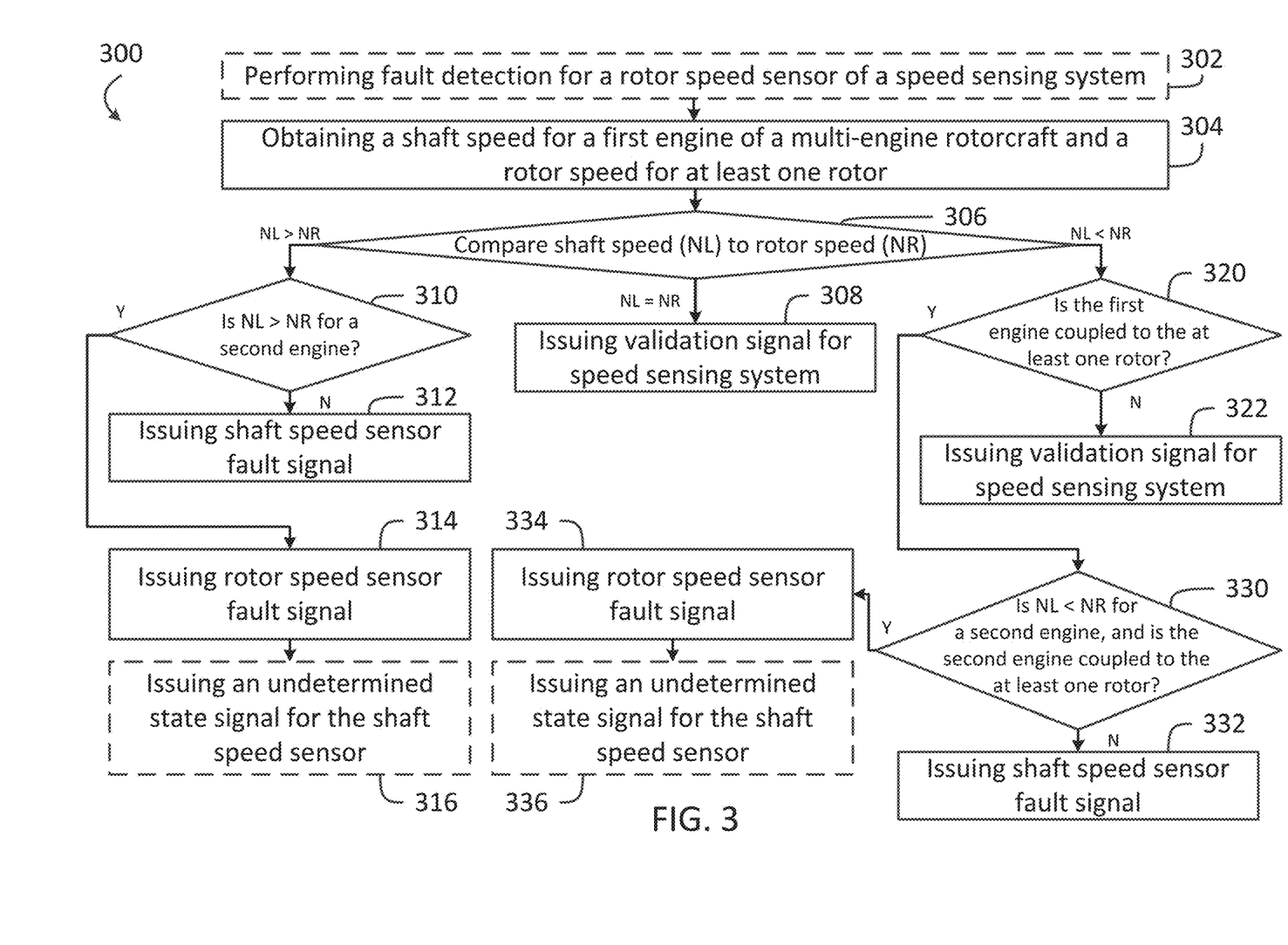
FIG. 3 is a flowchart of an example fault detection method for a speed sensing system of a multi-engine rotorcraft having at least one rotor.

With continued reference to FIG. 10, and additional reference to FIG. 3, there is illustrated a flowchart describing a fault detection method 300 which can serve to detect the occurrence for fault events for one or more of the sensors 212, 222, 232 of the speed sensing system 200. As will be described in greater detail hereinbelow, the fault detection method 300 obtains readings from the sensors 212, 222, 232 and performs comparisons therebetween in order to assess whether any of the sensors 212, 222, 232 have experienced a fault event.

Optionally, at step 302, fault detection for a rotor speed sensor, for instance the sensor 232 of the speed sensing system 200, is performed. Fault detection for the sensor 232 can be performed by comparing rotor speed readings obtained by the controllers 210, 220 from the controller 230 or from the sensor 232. For example, the controller 230 obtains rotor speed readings from the sensor 232, and provides the rotor speed readings to the controllers 210, 220. The controllers 210, 220 can exchange their received rotor speed readings to assess the validity of the sensor 232. If the rotor speed readings received by the controllers 210, 220 differ beyond a predetermined threshold, it can be concluded that the sensor 232 is experiencing a fault event. In some embodiments, the exchange of the rotor speed readings may be unidirectional: for instance, the controller 220 provides the controller 210 with the received rotor speed readings, and the controller 210 performs the comparison to determine whether the sensor 232 is experiencing a fault event. When a fault event for the sensor 232 is detected, the controller 210 informs the controller 220 of the fault event, and both controllers 210, 220 can take appropriate countermeasures.

As noted above, step 302 is optional. In some cases, step 302 is omitted because an assessment of whether the sensor 232 is experiencing a fault event can be detected in other ways, as discussed hereinbelow. In other cases, step 302 is omitted because the controllers 210, 220 are implemented via a single unified engine controller, and the unified engine controller receives only one input from the sensor 232, whether via the controller 230 or otherwise.

At step 304, a shaft speed for a first engine and a rotor speed for at least one rotor are obtained, for instance a shaft speed for the output shaft 154 of the engine 102, and a rotor speed for the rotor 108 forming part of the common load 170. The shaft speed can be obtained from the sensor 212, and the rotor speed can be obtained from the sensor 232, for instance via the controller 230; both the shaft speed and the rotor speed can be obtained at the controller 210, although it is considered that the same steps can be implemented by the controller 220, for instance using the shaft speed for the output shaft 154 of the engine 104, supplied by the sensor 222.

At decision step 306, a comparison is made between the shaft speed and the rotor speed. Depending on the result of the comparison, the method 300 proceeds to one of three subsequent steps. When the shaft speed and rotor speed are equal, or equal to within a tolerance or range, the method 300 proceeds to step 308. When the shaft speed is greater than the rotor speed, or above than the rotor speed by a predetermined amount or percentage, the method 300 proceeds to step 310. When the shaft speed is less than the rotor speed, or below the rotor speed by a predetermined amount or percentage, the method 300 proceeds to step 320.

The tolerance or ranges for the comparisons performed at step 306 can be predetermined based on a number of factors, including the model of the engines 102, 104, the model of the rotor 108, the mechanical coupling between the engines 102, 104 and the common load 170 provided by the gearbox 150, or any other suitable characteristics. In some cases, the tolerances or ranges can also be adjusted based on any number of operating parameters for the engines 102, 104, and/or the rotor 108, for instance a flight stage for the rotorcraft 100, an altitude or temperature of operation for the rotorcraft 100, or the like.

When the shaft speed and the rotor speed are equal, or equal within a predetermined tolerance or range, the method 300 moves from step 306 to step 308. At step 308, a validation signal for the speed sensing system 200 is issued. In some embodiments, the validation signal can be associated with the sensor 212, and can indicate that the readings provided by the sensor 212 have been validated. The validation of the sensor 212 can be for a predetermined time, or can be indicated as validated until the method 300 is repeated, as appropriate. In some other embodiments, when the shaft speed and the rotor speed are equal, or equal to within a predetermined tolerance, the method 300 can simply end, or return to a previous step (for instance step 302 or step 304), and no explicit validation signal is issued. In these embodiments, the sensors 212, 222, 232 can be considered validated unless indicated as faulty.

When the shaft speed is greater than the rotor speed, the method 300 moves to step 310. It should be noted that, because of the mechanical coupling between the output shafts 154 and the rotor 108—via the gearbox 150—situations in which the shaft speed is higher than the rotor speed do not occur under normal operating conditions. As a result, when the comparison at step 306 determines that the shaft speed is greater than the rotor speed, a fault is detected in the speed sensing system 200, and a fault signal is issued for the speed sensing system 200, as discussed hereinbelow.

At decision step 310, the rotor speed is compared to a corresponding shaft speed of a second engine of the rotorcraft 100. In this example, the rotor speed obtained from the sensor 232, for instance via the controller 230, is compared to the shaft speed provided by the sensor 212 for the engine 102 at step 306; at step 308, the rotor speed is compared to the corresponding shaft speed for the engine 104, which is provided by the sensor 222, and which can be obtained via the controller 220. When the corresponding shaft speed is greater than the rotor speed, the method 300 moves to step 314. When the corresponding shaft speed is not greater than the rotor speed, the method 300 moves to step 312.

In the case where the comparison of the corresponding shaft speed and the rotor speed indicates that the corresponding shaft speed is not greater than the rotor speed, the method 300 moves from decision step 310 to step 312. At step 312, a shaft speed sensor fault signal is issued, which indicates that the shaft speed sensor which provided the shaft speed for the engine 102, in this case the sensor 212, is faulty. In this case, because the shaft speed was found to be greater than the rotor speed at decision step 306—an outcome which does not occur under normal operating conditions—but the corresponding shaft speed for the engine 104 was not found to be greater than the rotor speed at decision step 310, it is concluded that the sensor 212 which reports the shaft speed is faulty. As a result, a fault signal which indicates that the sensor 212 is faulty is issued.

In the case where the comparison of the corresponding shaft speed and the rotor speed indicates that the corresponding shaft speed is also greater than the rotor speed, the method 300 moves from decision step 310 to step 314. At step 314, a rotor speed sensor fault signal is issued, which indicates that the rotor speed sensor which provided the rotor speed for the rotor 108, in this case the sensor 232, is faulty. In this case, because the both the shaft speed and the corresponding shaft speed were found to be greater than the rotor speed at decision steps 306 and 310—outcomes which do not occur under normal operating conditions—it is concluded that the sensor 232 which reports the rotor speed is faulty. As a result, a fault signal which indicates that the sensor 232 is faulty is issued.

Optionally, the method 300 moves from step 314 to step 316. At optional step 316, an undetermined state signal is issued for the shaft speed sensor, in this case sensor 212. Because the results of the comparisons at decision steps 306 and 310 indicate that the sensor 232 is faulty, the validity of the sensor 212 is unknown. As a result, an undetermined state signal can be issued to assign an undetermined state to the sensor 212.

When the shaft speed is less than the rotor speed, the method 300 moves to step 320. It should be noted that, because of the mechanical coupling between the output shafts 154 and the rotor 108—via the gearbox 150—situations in which the shaft speed is lower than the rotor speed can occur when the engine 102 is decoupled from the rotor 108. As a result, when the comparison at step 306 determines that the shaft speed is less than the rotor speed, the method 300 moves to step 320.

At decision step 320, a determination is made regarding whether the engine 102 is coupled to the rotor 108. In some embodiments, the determination is made based on a fuel flow to the engine 102, for instance as provided by the fuel source 250. For example, the fuel flow to the engine 102 is compared to a predetermined fuel flow threshold: when the fuel flow is above the threshold, the engine 102 is determined to be coupled to the rotor 108 (i.e., not decoupled), and when the fuel flow is below the threshold, the engine 102 is determined to be decoupled from the rotor 108. When the engine 102 is determined to be coupled to the rotor 108, the method 300 moves to step 330. When the engine 102 is determined to be decoupled from the rotor 108, the method 300 moves to step 322.

In some embodiments, the fuel flow to the engine 102 can be adjusted based on one or more operating conditions for the engine 102, for instance an ambient temperature or an ambient pressure of the environment in which the engine 102 is operating. The adjusted fuel flow is then compared to the threshold, and the engine 102 is determined to be coupled or decoupled based on the comparison. In some other embodiments, the threshold can be adjusted based on the one or more operating conditions for the engine 102, or can be determined dynamically based on any suitable parameters. It should also be noted that other approaches for assessing whether the engine 102 is decoupled from the rotor 108 are considered. For instance, a compressor pressure for the engine 102 and/or an exhaust gas temperature for the engine 102 can be compared to relevant thresholds to assess whether the engine 102 is decoupled from the rotor 108.

In the case where it is determined that the engine 102 is decoupled, the method 300 moves from decision step 320 to step 322. At step 322, a validation signal for the speed sensing system 200 is issued. In some embodiments, the validation signal can be associated with the sensor 212, and can indicate that the readings provided by the sensor 212 have been validated. The validation of the sensor 212 can be for a predetermined time, or can be indicated as validated until the method 300 is repeated, as appropriate. In some other embodiments, when it is determined that the engine 102 is decoupled from the rotor 108, the method 300 can simply end, or return to a previous step (for instance step 302 or step 304), and no explicit validation signal is issued. In these embodiments, the sensors 212, 222, 232 can be considered validated unless indicated as faulty.

In the case where it is determined that the engine 102 is coupled, the method 300 moves from decision step 320 to decision step 330. At decision step 330, the rotor speed is compared to the corresponding shaft speed of the engine 104, which is provided by the sensor 222, and which can be obtained via the controller 220. Additionally, a determination is made regarding whether the engine 104 is coupled to the rotor 108. When the corresponding shaft speed is less than the rotor speed, and when the second engine is determined to be coupled, the method 300 moves to step 334. When either the corresponding shaft speed is not less than the rotor speed, or when the second engine is not determined to be coupled, the method 300 moves to step 332.

In the case where the corresponding shaft speed is not less than the rotor speed, and when the second engine is determined to be coupled, the method 300 moves from decision step 330 to step 332. At step 332, a shaft speed sensor fault signal is issued, which indicates that the shaft speed sensor which provided the shaft speed for the engine 102, in this case the sensor 212, is faulty. In this case, because the shaft speed was found to be less than the rotor speed while the engine 102 to the rotor 108, and because a similar set of conditions was not identified for the engine 104, it is concluded that the sensor 212 which reports the shaft speed is faulty. As a result, a fault signal which indicates that the sensor 212 is faulty is issued.

In the case where the corresponding shaft speed is less than the rotor speed, and when the engine 104 is determined to be coupled to the rotor 108, the method 300 moves from decision step 330 to step 334. At step 334, a rotor speed sensor fault signal is issued, which indicates that the rotor speed sensor which provided the rotor speed for the rotor 108, in this case the sensor 232, is faulty. In this case, because the both the shaft speed and the corresponding shaft speed were found to be less than the rotor speed at decision steps 306 and 330 while engines 102 and 104 were determined as being coupled to the rotor 108 at decision steps 320 and 330, it is concluded that the sensor 232 which reports the rotor speed is faulty. As a result, a fault signal which indicates that the sensor 232 is faulty is issued.

Optionally, the method 300 moves from step 334 to step 336. At optional step 336, an undetermined state signal is issued for the shaft speed sensor, in this case sensor 212. Because the results of the comparisons at decision steps 306, 320, and 330 indicate that the sensor 232 is faulty, the validity of the sensor 212 is unknown. As a result, an undetermined state signal can be issued to assign an undetermined state to the sensor 212.

Because of the established mechanical coupling between the output shafts 154 and the common output shaft 158, the results of comparisons between the shaft speed for the engine 102, the rotor speed for the rotor 108, and optionally the shaft speed for the engine 104, can be used to perform fault detection for the speed sensing system 200, including the sensors 212, 222, 232. In some embodiments, the method 300, when implemented within an engine controller, for instance the controllers 210, 220, can reduce or eliminate the need for sensor redundancy within the engines 102, 104 and/or within the common load 170. That is to say, in some embodiments, the sensors 212, 222, 232 can be single sensors, without any redundancy, allowing for reduced cost and/or weight requirements for the engine 102, 104, and for the rotorcraft 100. It should be noted that although the foregoing description of the method 300 was provided from the perspective of the controller 210, the controller 220 can also implement the method 300, for instance concurrently with the implementation of the method 300 by the controller 210. From the perspective of the controller 220, the corresponding shaft speed is the shaft speed provided by the sensor 212, which can be obtained via the controller 210.

Figure 4:
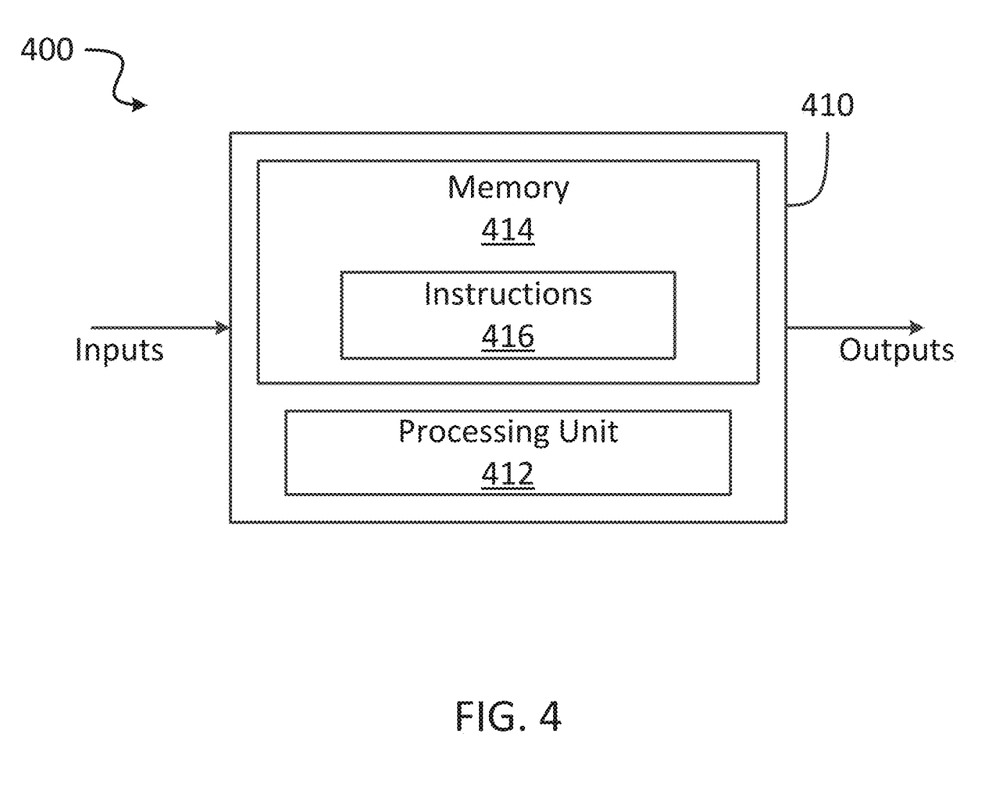
FIG. 4 is a block diagram of an example computing device for implementing the method of FIG. 3.

With reference to FIG. 4, the method 300 may be implemented by a computing device 410, which can embody part or all of the speed sensing system 200, for instance the controller 210 and/or the controller 220. The computing device 410 comprises a processing unit 412 and a memory 414 which has stored therein computer-executable instructions 416. The processing unit 412 may comprise any suitable devices configured to implement the functionality of the speed sensing system 200 and/or the functionality described in the method 300, such that instructions 416, when executed by the computing device 410 or other programmable apparatus, may cause the functions/acts/steps performed by the speed sensing system 200 and/or described in the method 300 as provided herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A fault detection method for a speed sensing system of a multi-engine rotorcraft having at least one rotor, the method comprising:
obtaining a shaft speed for a first engine of the multi-engine rotorcraft and a rotor speed for the at least one rotor;
comparing the shaft speed to the rotor speed;
when the shaft speed is greater than the rotor speed, detecting a first fault in the speed sensing system and issuing a first speed sensing system fault signal; and
when the shaft speed is less than the rotor speed:
determining whether the first engine is coupled to the at least one rotor based on a fuel flow to the first engine;
detecting a second fault in the speed sensing system and issuing a second speed sensing system fault signal responsive to determining that the first engine is coupled to the at least one rotor; and
controlling the multi-engine rotorcraft according to the first speed sensing system fault signal or the second speed sensing system fault signal.

2. The method of claim 1, wherein detecting the second fault comprises determining whether a second engine of the multi-engine rotorcraft is coupled to the at least one rotor based on a corresponding fuel flow for the second engine, and wherein issuing the second speed sensing system fault signal comprises issuing a shaft speed sensor fault signal responsive to detecting a shaft speed sensor fault in the speed sensing system when the second engine is decoupled from the at least one rotor.

3. The method of claim 2, wherein issuing the second speed sensing system fault signal comprises issuing a rotor speed sensor fault signal responsive to detecting a rotor speed sensor fault in the speed sensing system when the second engine is coupled to the at least one rotor.

4. The method of claim 3, wherein issuing the second speed sensing system fault signal comprises issuing an undetermined state signal to assign an undetermined validity state to the shaft speed sensor.

5. The method of claim 1, wherein detecting the first fault comprises comparing the rotor speed to a corresponding shaft speed of a second engine of the multi-engine rotorcraft, and wherein issuing the first speed sensing system fault signal comprises issuing a shaft speed sensor fault responsive to detecting a shaft speed sensor fault in the speed sensing system when the corresponding shaft speed is not greater than the rotor speed.

6. The method of claim 5, wherein issuing the first speed sensing system fault signal comprises issuing a rotor speed sensor fault signal responsive to detecting a rotor speed sensor fault in the speed sensing system when the corresponding shaft speed is greater than the rotor speed.

7. The method of claim 6, wherein issuing the first speed sensing system fault comprises issuing an undetermined state signal to assign an undetermined validity state to the shaft speed sensor.

8. The method of claim 1, wherein the rotor speed is obtained by a first controller associated with the first engine, the method further comprising:

obtaining a corresponding rotor speed via a second controller associated with a second engine of the multi engine rotorcraft;

comparing the rotor speed to the corresponding rotor speed; and issuing a rotor speed sensor fault signal responsive to determining that the rotor speed and the corresponding rotor speed differ beyond a predetermined rotor speed threshold.

9. The method of claim 1, wherein determining whether the first engine is coupled to the at least one rotor based on the fuel flow to the first engine comprises:

adjusting the fuel flow to the first engine based on at least one ambient condition to the first engine; and comparing the adjusted fuel flow to a predetermined fuel flow threshold;

wherein the first engine is determined to be decoupled from the at least one rotor when the adjusted fuel flow is below the predetermined fuel threshold.

10. The method of claim 1, wherein comparing the shaft speed to the rotor speed comprises applying a scaling factor to one of the shaft speed and the rotor speed, the scaling factor based on a mechanical coupling between the first engine and the at least one rotor.

11. A system for performing fault detection for a speed sensing system of a multi-engine rotorcraft having at least one rotor, the system comprising:

a processing unit; and a non-transitory computer-readable medium having stored thereon program instructions executable by the processing unit for:

obtaining a shaft speed for a first engine of the multi-engine rotorcraft and a rotor speed for the at least one rotor;

comparing the shaft speed to the rotor speed;

when the shaft speed is greater than the rotor speed, detecting a first fault in the speed sensing system and issuing a first speed sensing system fault signal; and when the shaft speed is less than the rotor speed:

determining whether the first engine is coupled to the at least one rotor based on a fuel flow to the first engine;

detecting a second fault in the speed sensing system and issuing a second speed sensing system fault signal responsive to determining that the first engine is coupled to the at least one rotor; and controlling the multi-engine rotorcraft according to the first speed sensing system fault signal or the second speed sensing system fault signal.

12. The system of claim 11, wherein detecting the second fault comprises determining whether a second engine of the multi-engine rotorcraft is coupled to the at least one rotor based on a corresponding fuel flow for the second engine, and wherein issuing the second speed sensing system fault signal comprises issuing a shaft speed sensor fault signal responsive to detecting a shaft speed sensor fault in the speed sensing system when the second engine is decoupled from the at least one rotor.

13. The system of claim 12, wherein issuing the second speed sensing system fault signal comprises issuing a rotor speed sensor fault signal responsive to detecting a rotor speed sensor fault in the speed sensing system when the second engine is coupled to the at least one rotor.

14. The system of claim 13, wherein issuing the second speed sensing system fault comprises issuing an undetermined state signal to assign an undetermined validity state to the shaft speed sensor.

15. The system of claim 11, wherein detecting the first fault comprises comparing the rotor speed to a corresponding shaft speed of a second engine of the multi-engine rotorcraft, and wherein issuing the first speed sensing system fault signal comprises issuing a shaft speed sensor fault responsive to detecting a shaft speed sensor fault in the speed sensing system when the corresponding shaft speed is not greater than the rotor speed.

16. The system of claim 15, wherein issuing the first speed sensing system fault signal comprises issuing a rotor speed sensor fault signal responsive to detecting a rotor speed sensor fault in the speed sensing system when the corresponding shaft speed is greater than the rotor speed.

17. The system of claim 16, wherein issuing the first speed sensing system fault comprises issuing an undetermined state signal to assign an undetermined validity state to the shaft speed sensor.

18. The system of claim 11, wherein the rotor speed is obtained by a first controller associated with the first engine, and wherein the instructions are further executable for:

obtaining a corresponding rotor speed via a second controller associated with a second engine of the multi engine rotorcraft;

comparing the rotor speed to the corresponding rotor speed; and issuing a rotor speed sensor fault signal responsive to determining that the rotor speed and the corresponding rotor speed differ beyond a predetermined rotor speed threshold.

19. The system of claim 11, wherein determining whether the first engine is coupled to the at least one rotor based on the fuel flow to the first engine comprises:

adjusting the fuel flow to the first engine based on at least one ambient condition to the first engine; and comparing the adjusted fuel flow to a predetermined fuel flow threshold;

wherein the first engine is determined to be decoupled from the at least one rotor when the adjusted fuel flow is below the predetermined fuel threshold.

20. The system of claim 11, wherein comparing the shaft speed to the rotor speed comprises applying a scaling factor to one of the shaft speed and the rotor speed, the scaling factor based on a mechanical coupling between the first engine and the at least one rotor.

* * * * *